(12) United States Patent
Lottenbach et al.

(10) Patent No.: US 10,851,249 B2
(45) Date of Patent: Dec. 1, 2020

(54) TEXTILES HAVING FLAME PROTECTION FUNCTION

(71) Applicant: Schoeller Textil AG, Sevelen (CH)

(72) Inventors: Roland Lottenbach, Staad (CH); Vedran Gartmann, Zurich (CH)

(73) Assignee: Schoeller Textil AG

( * ) Notice: Subject to any disclaimer, the term of this patent is extended or adjusted under 35 U.S.C. 154(b) by 105 days.

(21) Appl. No.: 16/072,530

(22) PCT Filed: Jan. 27, 2017

(86) PCT No.: PCT/EP2017/051831
§ 371 (c)(1),
(2) Date: Jul. 25, 2018

(87) PCT Pub. No.: WO2017/129783
PCT Pub. Date: Aug. 3, 2017

(65) Prior Publication Data
US 2019/0062571 A1 Feb. 28, 2019

(30) Foreign Application Priority Data
Jan. 29, 2016 (CH) ........................................ 116/16

(51) Int. Cl.
| | | |
|---|---|---|
| *C09D 5/18* | (2006.01) |
| *C09K 21/02* | (2006.01) |
| *D06M 11/74* | (2006.01) |
| *D06M 15/564* | (2006.01) |
| *C09D 7/40* | (2018.01) |
| *C08G 18/80* | (2006.01) |
| *C08G 18/75* | (2006.01) |
| *C08G 18/48* | (2006.01) |
| *C08G 18/34* | (2006.01) |
| *C08G 18/73* | (2006.01) |
| *C08G 18/79* | (2006.01) |
| *C08G 18/76* | (2006.01) |
| *C08G 18/44* | (2006.01) |
| *C08G 18/08* | (2006.01) |
| *C08G 18/66* | (2006.01) |
| *C08J 9/00* | (2006.01) |
| *C08J 9/30* | (2006.01) |
| *D06N 3/14* | (2006.01) |
| *D06N 3/00* | (2006.01) |
| *D06M 23/04* | (2006.01) |
| *C09D 7/61* | (2018.01) |
| *C09D 5/29* | (2006.01) |

(Continued)

(52) U.S. Cl.
CPC ......... *C09D 5/185* (2013.01); *C08G 18/0823* (2013.01); *C08G 18/348* (2013.01); *C08G 18/44* (2013.01); *C08G 18/4854* (2013.01); *C08G 18/6659* (2013.01); *C08G 18/6692* (2013.01); *C08G 18/73* (2013.01); *C08G 18/755* (2013.01); *C08G 18/758* (2013.01); *C08G 18/7621* (2013.01); *C08G 18/7671* (2013.01); *C08G 18/791* (2013.01); *C08G 18/797* (2013.01); *C08G 18/80* (2013.01); *C08J 9/0066* (2013.01); *C08J 9/30* (2013.01); *C09D 5/29* (2013.01); *C09D 7/61* (2018.01); *C09D 7/69* (2018.01); *C09D 7/70* (2018.01); *C09D 175/04* (2013.01); *C09K 21/02* (2013.01); *D06M 11/74* (2013.01); *D06M 15/564* (2013.01); *D06M 23/04* (2013.01); *D06N 3/0043* (2013.01); *D06N 3/0045* (2013.01); *D06N 3/0047* (2013.01); *D06N 3/0059* (2013.01); *D06N 3/0063* (2013.01); *D06N 3/14* (2013.01); *C08J 2201/026* (2013.01); *C08J 2207/00* (2013.01); *C08J 2333/04* (2013.01); *C08J 2375/06* (2013.01); *C08K 3/016* (2018.01); *C08K 3/04* (2013.01); *C08K 7/00* (2013.01); *D06M 2200/30* (2013.01)

(58) Field of Classification Search
None
See application file for complete search history.

(56) References Cited

U.S. PATENT DOCUMENTS

| 8,734,905 B2 | 5/2014 | Panse et al. |
| 2004/0166049 A1 | 8/2004 | Reinheimer et al. |

(Continued)

FOREIGN PATENT DOCUMENTS

| CN | 105177992 A | 12/2015 |
| EP | 1439146 A2 | 7/2004 |

(Continued)

OTHER PUBLICATIONS

Database WPI Week 201634 Thomson Scientific, London, GB; AN 2016-002950 XP002758762.

(Continued)

*Primary Examiner* — Nadine G Norton
*Assistant Examiner* — Bradford M Gates
(74) *Attorney, Agent, or Firm* — The Webb Law Firm

(57) ABSTRACT

The invention relates to flame-retardant foam coatings for textile sheet products, wherein the coatings include plate-like expandable graphite which has a reduced salt content and a particle distribution with a proportion of >80 percent by weight having a diameter of at least 0.2 mm, and/or a minimum proportion of 70% having a mesh size of >50 mesh (0.3 mm), at least one binder and at least one foam stabilizer, and also processes for the production thereof, the use thereof for producing textile sheet products and also textile sheet products having such flame-retardant foam coatings.

21 Claims, No Drawings

(51) Int. Cl.
*C09D 175/04* (2006.01)
*C08K 3/04* (2006.01)
*C08K 3/016* (2018.01)
*C08K 7/00* (2006.01)

(56) References Cited

U.S. PATENT DOCUMENTS

| | | |
|---|---|---|
| 2006/0202176 A1 | 9/2006 | Koyama et al. |
| 2008/0160852 A1 | 7/2008 | Yang |
| 2008/0280126 A1* | 11/2008 | Lenz .................. B29C 44/5618 428/319.3 |
| 2010/0273382 A1* | 10/2010 | Nandi ...................... C09D 5/18 442/76 |
| 2011/0183561 A1* | 7/2011 | Panse .................. D06M 23/14 442/138 |
| 2014/0303296 A1* | 10/2014 | Inazawa .................. C08L 27/18 524/127 |

FOREIGN PATENT DOCUMENTS

| | | |
|---|---|---|
| JP | 2009120994 A | 6/2009 |
| WO | 2009055046 A1 | 4/2009 |
| WO | 2014078943 A1 | 5/2014 |

OTHER PUBLICATIONS

Database WPI Week 200939 Thomson Scientific, London, GB; AN 2009-J89931 XP002758742.

* cited by examiner

TEXTILES HAVING FLAME PROTECTION FUNCTION

CROSS-REFERENCE TO RELATED APPLICATIONS

This application is the United States national phase of PCT International Application No. PCT/EP2017/051831 filed Jan. 27, 2017, and claims priority to Swiss Patent Application No. 00116/16 filed Jan. 29, 2016, the disclosures of each of which are hereby incorporated by reference in their entireties.

BACKGROUND OF THE INVENTION

Field of the Invention

The invention relates to flame-retardant foam coatings for textile sheet products, wherein the coatings comprise plate-like expandable graphite which has a reduced salt content and a particle distribution with a proportion of >80 percent by weight having a diameter of at least 0.2 mm, and/or a minimum proportion of 70% having a mesh size of >50 mesh (0.3 mm), at least one binder and at least one foam stabilizer, and also processes for the production thereof, the use thereof for producing textile sheet products and also textile sheet products having such flame-retardant foam coatings.

Related Art

Fire protection clothing is part of the basic equipment of persons who are exposed to fire and heat in the case of fire or other extreme situations. Optimal fire protection clothing gives protection against various external influences, in particular fire and heat. This requires a self-extinguishing behavior (limiting oxygen index LOI>25%), prevention of hole formation, insulation capability in an emergency case, and dimensional stability. At the same time, the fire protection clothing has to fulfill various use properties which are not a given in the case of conventional, inherently flame-retardant fibers. Examples which may be mentioned here are the abrasion resistance, the UV resistance or the capacity to be produced in luminous colors.

The use of expandable graphite as flame retardant in various applications is known from the prior art. Expandable graphite, which is produced by acid treatment of floc graphite, is able to make several times its own mass of combustible material flame resistant. In the case of fire, or when exposed to high temperatures, the particles of the expandable graphite expand and increase their volume by a multiple. The intumescence layer formed by the expanded expandable graphite, for example on a textile substrate, protects this textile substrate very efficiently since it prevents access of oxygen or flame formation and flame propagation and, due to the lower density of the expanded expandable graphite, additionally displays a very good thermal insulation effect. Heat can spread only with difficulty through the intumescence layer, so that the substrate and underlying tissues (skin) are efficiently protected.

Flame-retardant coatings based on expandable graphite are used for various applications. Known examples are, inter alia, fire protection boards, intumescent building materials, fire protection coatings, which foam spontaneously in the case of fire and protect the object to be protected against the heat of the fire.

However, despite decades of experience and research, available flame-retardant coatings for textiles are either not sufficiently effective and/or have poor comfort for the wearer (inflexibility, weight, restricted freedom of movement) and/or can be toxicologically problematical. The use of inherently flame-retardant textiles (for example aramid, modacrylic or viscose FR fibers) is generally limited by the low abrasion resistance, the restricted coloring, the likewise restricted comfort for the wearer and also the high price. In the case of known uses of expandable graphite as flame retardant in textile coatings, the particle size thereof is greatly limited. Small expandable graphite types are in principle less effective in respect of flame protection; thus, for example, the expansion volume and the expansion pressure thereof is significantly lower. Both are prerequisites for making textiles flame resistant since the combustible textile surface which is softened by the action of flames finally has to be punctured and displaced as quickly as possible. In order to achieve a high flame-retardant effect using these expandable graphite particles, the coating has to contain a high proportion of expandable graphite or in turn be coated with a greater applied amount, which makes the textiles stiff and reduces the comfort for the wearer and has a disadvantageous effect on all use properties. Area-covering coatings therefore usually have to be dispensed with. This reduces the protective effect and thus restricts the possible uses for such protective textiles.

The offering of functional flame-retardant materials in general and in particular on the basis of expandable graphite for textiles is therefore still small.

SUMMARY OF THE INVENTION

It is an object of the invention to avoid the abovementioned disadvantages occurring in the case of the known flame-retardant textiles and provide a coating giving increased flame protection for textile sheet products.

It is likewise an object of the invention to provide a process for producing such flame-retardant coatings according to the invention.

The further object of the invention is to make available flame-retardant, textile sheet products having flame-retardant coatings according to the invention.

A further object of the invention is to provide flame-retardant, textile sheet products which in addition to the increased flame protection likewise have a high water vapor permeability and high breathing activity, are flexible and thus have good freedom of movement and handling. A further object of the invention is, in contrast to the inherently flame-retardant textiles, to provide flame-retardant, textile sheet products which in addition to the increased flame protection have an optical protective function based on luminous colors (in accordance with EN ISO 20471) and are therefore optically conspicuous and visually readily perceptible.

It is also an object of the invention to provide a method for producing such textile sheet products according to the invention.

This object is achieved according to the invention by the features of the independent claims. Further advantageous embodiments of the invention are depicted in the dependent claims.

In some examples, there is provided a process for producing a flame-retardant, textile sheet product comprising a textile substrate layer, which comprises: a) reduction of the salt content of plate-like expandable graphite by additional washing, to a proportion of below 0.8% by weight, on a basis of total weight of the plate-like expandable graphite which has been reduced in salt, the plate-like expandable graphite having an average plate diameter of at least 0.5 mm, and/or a minimum proportion of 70% by weight having a mesh size of >50 mesh (0.3 mm) being selected, b) production of a paste comprising at least one binder, at least one foam stabilizer and expandable graphite which has been reduced in salt as specified in a), c) mechanical foaming of a paste produced according to b), d) coating of a textile substrate layer with a foam produced according to c), e) drying of the foam layer, and f) optionally pressing of the foam layer after drying.

Also provided in some examples is a flame-retardant, textile sheet product produced by the process(es) disclosed herein, wherein the flame-retardant coating contains plate-like expandable graphite, at least one binder and at least one foam stabilizer.

Also provided in some examples is a flame-retardant, textile sheet product produced by the process(es) disclosed herein for production of flame protection clothing.

DETAILED DESCRIPTION

The production of commercially available expandable graphite is known. As a result of chemical treatment of graphite, treatment agents such as sulfur compounds and nitrogen compounds become embedded in the lattice structure of the graphite, as a result of which the graphite becomes expendable.

In the present process according to the invention, the commercially available expandable graphite (also referred to as standard expandable graphite in the following) is subjected to a wet washing process, preferably by aqueous wet sieving, in an additional treatment step, as a result of which the salt content which can be washed out can be reduced in a controlled manner to a proportion of preferably below 0.8%. The salt content which can be washed out is preferably reduced to below 0.5% and particularly preferably to below 0.2%.

In a preferred embodiment, the standard expandable graphite is rewashed with water.

The salt content can be determined or confirmed by means of a modified Soxhlet extraction in accordance with DIN EN ISO 13944, using distilled water instead of an organic solvent.

As a result of this after-treatment, or this desalting, expandable graphite can be used as foam coating having a greater plate size for the production of textile coatings. The after-treatment prevents salts (e.g. sulfuric acid salts, nitrate and nitrite salts) present on the surface of the expandable graphite plates from being able to have adverse effects, for example coagulation, on the foam coating. Thanks to the larger plate size, the expansion volume and pressure increase exponentially and the proportion of expandable graphite in the coating can be reduced while obtaining a better protective action. In contrast to the point coating hitherto customary, the surface of the textile can be made flame-retardant throughout, which increases the performance further. The expansion and the flame protection produced thereby are increased by a multiple, without having adverse effects on the further properties such as water vapor permeability, breathing activity, freedom of movement and freedom of handling.

As a result of the reduction in the salt content which can be washed out of the expandable graphite (or the foam coating which has become possible as a result), larger expandable graphite plates can be used in the flame-retardant coatings of the invention and it is for the first time possible to produce area-covering, continuous coatings having an expansion which is greater by a multiple and a correspondingly thicker intumescence layer which offers a correspondingly greater, excellent protection against the effect of flames to the exposed person. An examination of the heat transmission in accordance with ISO 9151:1995 made it possible to show that the time between heating of the skin by 12° C. (onset of pain) to heating by 24° C. (2nd degree burns) during which the wearer can react to the fire can be doubled from 1.6 to 3.2 s by means of the salt-reduced expandable graphite used, compared to a conventional flame protection article.

The expandable graphite used as starting material in the process of the invention is, in particular, produced as floc graphite by means of acid treatment. This expandable graphite consists essentially of carbon and of small amounts of natural rock constituents and minerals. In addition, there are intercalating agents which are, however, bound only in the interior of the flocs in the additionally washed state.

Expandable graphite having different technical specifications can be used: the expandable graphite can, for example, have a carbon content of at least 90%, in particular at least 92% and preferably at least 98%. Furthermore, the ash content of the expandable graphite can be selected so as to be a maximum of 10%, in particular a maximum of 8% and preferably a maximum of 2%.

According to the present invention, at least 80%, preferably at least 90%, preferably 95%, of the expandable graphite has the form of plates having an average diameter of at least 0.2 mm, preferably in the range from 0.3 to 2.0 mm, most preferably in the range from 0.3 to 0.5 mm, and a thickness of <0.5 mm, preferably in the range from 0.01 to 0.1 mm, preferably 0.05 mm, and/or at least 70% of the expandable graphite has a mesh size of >50 mesh (0.3 mm). The increased expansion achieved as a result of the increase in the plate size, based on a temperature of 1000° C., is at least 40 ml/g, in particular at least 100 ml/g and preferably at least 300 ml/g, with the start temperature at which expansion commences preferably being in the range from 160 to 200° C., in particular from 180 to 200° C. and preferably 190° C.

These characteristic properties of the expandable graphite, in particular the greater plate size made possible by the reduced salt content, have a direct influence on the expansion rate which is increased by a multiple, which means improved flame protection.

To produce the flame-retardant coating of the invention, the binder is initially provided and mixed with the expandable graphite and the foam stabilizer to give a paste. If desired or necessary, further additives to improve the producibility and suitability of the coating material, e.g. cross-linkers, pigments and fluorocarbon, are then added. Finally, optional additives having additional functions (resistance to acids, alkalis, solvents, light stabilizers, free-radical scavengers, etc.) can subsequently be added with stirring.

The binders used in the process of the invention are polyurethanes, polyacrylates or polyvinyl acetates, preferably polyurethanes having a molar mass of <700 g/mol, which are obtainable by reaction of polyfunctional, aliphatic, cycloaliphatic and aromatic isocyanates known in polyurethane chemistry, for example hexane diisocyanate, the various isomers of tolylene diisocyanate, diphenylmethane diisocyanate, with compounds having at least 2, in particular at least 3, reactive functional groups X—H (X=N, O, S) and a molecular weight range of from about 100 to 6000. As compounds of this type, mention may be made of relatively high molecular weight reactive compounds such as polyesters, polyethers, polyacetals, polyamides and polyesteramides, but also low molecular weight polyols having, in particular, more than 2 OH groups, e.g. trimethylolpropane, 1,3,5-hexanetriol, glycerol and pentaerythritol, or alkanolamines, e.g. triethanolamine; the polyurethanes obtained in each case have terminal hydroxyl, carboxyl or amino and also NCO groups, with the reaction of the relatively high molecular weight reactive compounds with the isocyanates optionally also being carried out in the presence of chain extenders, as is well known to a person skilled in the art.

In general, a water-based dispersion of a binder, for example a polyurethane, is used for producing the paste. Thus, ionomeric polyurethanes are particularly suitable. The polyurethane dispersions preferably have a solids content of from 30 to 70% by weight, in particular about 50% by weight. Preferred polyol components are various polyester polyols and polyether polyols, e.g. Pluriol® P 2000 (BASF) and Caradol®36-3 (Shell). Flame-retardant polyols containing, for example, phosphate or halogen groups can also be used as polyols. Possible isocyanate components are, for example, diphenylmethane 4,4'-diisocyanate (MDI), isomers of tolylene diisocyanate (TDI) or hexamethylene diisocyanate (HDI). In further embodiments, polyacrylate dispersions or other synthetic resin dispersions can also be used as binders. Polyurethane dispersions which are particularly preferably used according to the invention include Dicrylan PGS (ERBA AG, Zurich, CH), Lamethan ADH-L (CHT) and Ruco-Coat EC 4811 (Rudolf-Chemie). A polyacrylate dispersion which is particularly preferably used according to the invention is Dicrylan AS (ERBA AG, Zurich, CH).

The binder is preferably used in an amount of from 20 to 70% by weight, preferably from 30 to 50% by weight, of the paste.

The foam stabilizers used in the process of the invention are generally a preparation composed of ammonium stearate and alkylamine stearate and specific surfactants, in particular Dicrylan Stabilizer 7805 (ERBA AG, Zurich, CH).

The foam stabilizer is preferably used in an amount of from 10 to 40% by weight, preferably from 10 to 20% by weight, based on the total weight of the paste.

Furthermore, crosslinkers and/or inorganic and/or organic dyes and pigments and/or further admixtures can be added to the paste.

Thus, the paste comprises, for example, a crosslinker in preferred embodiments. As crosslinker, preference is given to using, according to the invention, an amino resin or a blocked isocyanate. Suitable amino resins or blocked isocyanates are, for example, the generally known commercial products Knittex CHN (ERBA) or Phobol XAN (ERBA). Preference is given to melamine-formaldehyde resins, in particular alkyl-modified melamine-formaldehyde derivatives. The melamine-formaldehyde derivatives are usually employed in powder form or preferably in the form of aqueous solutions having a solids content of from 10 to 50% by weight, preferably from 20 to 30% by weight. Crosslinkers which are preferably used according to the invention are Knittex CHN (ERBA AG, Zurich, CH).

The crosslinker is preferably used in an amount of from 0 to 10% by weight, preferably from 1 to 5% by weight, based on the total weight of the paste.

In further preferred embodiments, the paste can additionally contain pigments. The pigments used according to the invention can be inorganic or organic pigments.

Suitable pigments are, for example, white pigments or black pigments. White pigments used according to the invention are titanium dioxide, calcium carbonate, zinc carbonate, zinc oxide, silicates or silica, alabaster brilliant white, kaolin or a similar material, preferably titanium dioxide. White pigments are preferably used as aqueous dispersion. Black pigments used according to the invention are all types of carbon black, for example gas black, acetylene black, thermal black, furnace black and lamp black, in particular lamp black. Black pigments are preferably used in the form of an aqueous dispersion having a solids content of from 10 to 60%, preferably from 20 to 40%.

The pigment is preferably used in an amount of from 0.01 to 10% by weight, particularly preferably in an amount of from 0.1 to 5% by weight, based on the total weight of the paste.

In further embodiments, thickeners can be added to the paste in order to adjust the viscosity. Suitable thickeners are conventional thickeners such as alginates, hydroxymethyl celluloses, polyacrylic acids, polyvinylpyrrolidones, silicates and sheet silicates (e.g. bentonites), kaolins, and the like. Thickeners used according to the invention are preferably alginates, hydroxymethyl celluloses or acrylic acid thickeners, in particular neutralized acrylic acid thickeners, with the viscosity being brought to a range from 10 to 30 dPa*s, particularly preferably about 20 dPa*s.

The thickener is preferably used in an amount of from 0 to 10% by weight, particularly preferably in an amount of from 2 to 6% by weight, based on the total weight of the paste.

In further embodiments, the paste contains a fluorocarbon in order to lower the moisture absorption and tendency to swell. The fluorocarbon can be a partially fluorinated or perfluorinated polymer. Both homopolymers and copolymers are suitable. Particularly suitable polymers are, inter alia, fluoroalkyl acrylate homopolymers and fluoroalkyl acrylate copolymers. Preferred fluorocarbons have perfluoroalkyl-containing side groups which can be introduced by, for example, polymerization of perfluoroalkyl-containing monomers into the fluoropolymer.

Examples of commercially available fluorocarbons include, for example, Tubiguard, Evoral®, Oleophobol, Scotchguard, Repellan, Ruco-Guard, Unidyne, Quecophob and Nuva, and others.

The fluorocarbon is preferably used in an amount of from 0.1 to 10% by weight, particularly preferably in an amount of from 1 to 5% by weight, based on the total weight of the paste.

In other embodiments, the paste can contain further additives such as emulsifiers, light stabilizers and/or further fillers such as chalk (to reduce the cost).

In a further embodiment, the paste can contain red phosphorus, preferably in the form of microcapsules. On contact with the flame, the red phosphorus burns very much more quickly than the woven textile, as a result of which the rate of temperature increase is significantly raised and the expandable graphite is consequently heated more quickly. As a result, the expandable graphite expands earlier and thus increases the flame-retardant effect. In addition, various phosphorus oxides, mainly phosphorus pentoxide, are formed on the combustion of red phosphorus, which withdraw water from the material and carbonize it. The phosphoric acid formed in the reaction of phosphorus pentoxide and the withdrawn water carbonizes the material further and forms an additional protective layer for inhibiting the access of oxygen. The use of a paste obtained in this way leads to a flame-retardant textile sheet product which gives good values in edge flaming.

The red phosphorus is preferably used in an amount of from 5 to 20% by weight, based on the total weight of the paste.

It goes without saying that the various additives can overlap structurally.

The paste is foamed continuously, in general mechanically, before application to the textile substrate. This can be carried out in a foam generator by blowing in compressed air and beating between a rotor and a stator. A further possibility is to foam the paste in a foam mixing apparatus with introduction of high shear forces. Preference is given to using a Hansa ECO-MIX (Hansa mixer). Foaming is carried out in such a way that the foam density obtained is, depending on the field of application for pressed foams, in the range from 80 to 300 g/l, preferably from 80 to 200 g/l, particularly preferably from 100 to 150 g/l. To obtain stable foams, the preferred density is in the range from 150 to 600 g/l; a person skilled in the art will know that the particularly preferred ranges are determined by the final application and cannot be given for all applications together.

The coating process for the foam is carried out using a foam application system by means of roller coaters, air coaters, Variopress or preferably using roller coaters. The foam is pumped upstream of the coater, where coating in a thickness which can be regulated by the gap width selected takes place. The gap widths are generally in the range from about 0.5 to 3 mm, in general preferably 1 mm, with a person skilled in the art being able to deviate from this size as a function of the application. In a further embodiment, a plurality of layers can be applied on top of one another for greater coating thicknesses.

The foam is generally applied in a layer thickness of <2 mm, preferably from about 0.5 to 2 mm, more preferably from 0.8 to 1.2 mm, to a textile. The layer thickness is generally matched to the maximum size of the graphite particles, so the gap preferably corresponds to at least 1.6 times the maximum particle size. The amount of foam coating to be applied varies as a function of the desired properties of the textile sheet product according to the invention and is from about 20 to 400 g/m$^2$; a person skilled in the art will know that the preferred range once again depends on the field of application and cannot be given for all applications together.

In a first step, the foam obtained is dried in the stretcher frame at generally relatively low temperatures of from about 80 to 100° C. (in order to avoid crosslinking of the polymer binder used). At the exit from the stretcher frame, the dried foam is pressed by two rollers, as a result of which the foam disintegrates and is pressed to give a membrane-like layer. As a result of the subsequent condensation, the layer is fixed in this form. This process is suitable in general for all laminates for outer clothing, trousers and the like.

In the case of stable foam coatings having relatively high densities, the paste is foamed continuously in the same way as in the case of the above-described unstable foam and applied to the textile. The stable foams are likewise carefully dried at from about 80 to 100° C. in the stretcher frame. To additionally increase the stability of the foam, partial or complete crosslinking can be achieved by setting the hindmost stretcher frame fields to a relatively high temperature of from about 120 to 170° C.

Complete crosslinking can be effected by means of an additional condensation step at a temperature of from about 130 to 170° C. Stable foams are useful when haptic (for example a foam handle), optical (for example neoprene-like optics) or other requirements are demanded of the textile in addition to flame protection. Thus, for example, gentle impact protection or thermal insulation can be achieved by means of stable foams.

The flame-retardant coating is particularly suitable for goods as outer clothing. Any textile substrate can in principle be used as substrate material. Suitable textile substrates are, for example, woven, knitted or non-woven textile substrate materials or combinations thereof. Fibers of vegetable or animal origin, chemical fibers, fibers composed of synthetic polymers, inorganic chemical fibers, preferably cotton, synthetic fibers such as polyamide, polyacrylic, Elasthane, polyester and/or polyethylene have been found to be suitable for the outer material. It goes without saying that fusible materials are advantageous for coating with expandable graphite and the flame protection application.

A flame-retardant textile sheet product according to the invention comprises a plurality of layers, with the first layer being a textile substrate layer. As a further layer, a flame-retardant coating according to the invention, for example, can be arranged thereon and have been applied as per the above description to the textile substrate layer.

In a preferred embodiment, the outer material can be partly (in particular patterns) or entirely colored with luminous dyes in order (in accordance with EN ISO 20471) to ensure good visibility for the piece of clothing in a variety of ambient conditions. The use of such warning or signal colors is necessarily employed in many fields, e.g. police, fire fighters, railway employees, etc.

As further layer, one or more breathing-active membranes which are permeable to water vapor, preferably microporous PTFE, can be arranged at a suitable place in order to give the textile breathing activity.

The following illustrative formulations should be interpreted merely as representative embodiments and not as a restriction of the scope of the present invention. In addition to these formulations, a person skilled in the art will be able to derive various possible variations and modifications from the overall description, and these likewise come within the scope of protection of the claims.

EXAMPLES

Example 1: Unstable Foam

| % by weight | Constituent | Example |
| --- | --- | --- |
| 35% | Binder: Aliphatic polyester urethane dispersion, 50% solids content, as well as aromatic or even polyether urethanes; alternatively polyacrylate dispersions (very good hydrolysis resistance) or other synthetic resin dispersions. Preferably as aqueous dispersions. | Dicrylan PGS |
| 15% | Foam stabilizer: Preparation composed of ammonium stearate and alkylamine stearate and specific surfactants | Dicrylan Stabilizer 7805 |
| 1% | Pigment: Aqueous lamp black dispersion | |
| 3% | Crosslinker: Alkyl-modified melamine-formaldehyde derivative in aqueous solution. As an alternative, dispersions of blocked or free isocyanates. | Knittex CHN |
| 41% | Expandable graphite | |

The above formulation is foamed to 140 g/l to give an unstable foam and applied with 1 mm gap width and applied in an amount of 50 g/m$^2$ to the textile.

Example 2: Unstable Foam

1. Coating Paint for Luminous Colors (EN 20471)

| % by weight | Constituent | Example |
|---|---|---|
| 55% | Binder: Aliphatic polyester urethane dispersion, 50% solids content, as well as aromatic or even polyether urethanes; alternatively polyacryate dispersions (very good hydrolysis resistance) or other synthetic resin dispersions. Preferably as aqueous dispersions. | Dicrylan PGS |
| 25% | Foam stabilizer: Preparation composed of ammonium stearate and alkylamine stearate and specific surfactants | Dicrylan Stabilizer 7805 |
| 15% | Pigment: Aqueous TiO₂ dispersion | |
| 5% | Crosslinker: Alkyl-modified melamine-formaldehyde derivative in aqueous solution. As an alternative, dispersions of blocked or free isocyanates. | Knittex CHN |

The above formulation is foamed to 140 g/l to give an unstable foam and applied with 0.2 mm gap width and applied in an amount of 30 g/m² to the textile.

2. Coating Paint

| % by weight | Constituent | Example |
|---|---|---|
| 35% | Binder: Aliphatic polyester urethane dispersion, 50% solids content, as well as aromatic or even polyether urethanes; alternatively polyacrylate dispersions (very good hydrolysis resistance) or other synthetic resin dispersions. Preferably as aqueous dispersions. | |
| 15% | Foam stabilizer: Preparation composed of ammonium stearate and alkylamine stearate and specific surfactants | |
| 1% | Pigment: Aqueous lamp black dispersion | |
| 3% | Crosslinker: Alkyl-modified melamine-formaldehyde derivative in aqueous solution. As an alternative, dispersions of blocked or free isocyanates. | |
| 41% | Expandable graphite | |

The above formulation is foamed to 140 g/l to give an unstable foam and applied with 1 mm gap width and applied in an amount of 50 g/m² to the textile.

Example 3: Material for Outer Clothing (Standard)

Outer material: 95% polyamide, 5% Elasthane, ripstop weave
Lining: 45% cotton, 55% modacrylic FR, jersey knit
Production Steps:
Coating at left on outer material
Lamination with lining
Drying at 80-100° C. increasing (60-180 s residence time, optimally 105 s residence time, surface temperature 80-90° C.)
Pressing on exit (crushing of foam to form a membrane-like layer)
Subsequently
Condensation at 150° C. (residence time 45-90 s at temperatures of >140° C.)

Formulation:

| 30-40% | Dicrylan PGS (ERBA) | Polyurethane binder |
|---|---|---|
| 10% | Water | |
| 15%-20% | Dicrylan Stabilizer 7805 | Foam stabilizer |
| 1-5% | Tubiguard BS | Fluorocarbon |
| 0.1-2% | Pigment | |
| 1-5% | Knittex CHN | Crosslinker |
| 20-30% | Expandable graphite | Active flame retardant material |

=>140 g/l foaming, 1 mm gap width, amount applied: 50 g/m², unstable foam (see below)

Example 4: Material for Outer Clothing in Warning Colors or for Light Colors Outer material: 100% polyester in linen weave
Lining: 45% cotton, 55% modacrylic FR in jersey knit
Production Steps:
Coating at left on outer material with white foam in order to be able to attain the required standards (EN ISO 20471) for luminous colors or the optics for light colors
Drying at 80-100° C. increasing (30-120 s residence time, preferably 45 s residence time, surface temperature 80-90° C.)
Pressing at the exit (crushing of the foam to give a membrane-like layer)
Subsequently
Coating at left on outer material
Lamination with lining
Drying at 80-100° C. increasing (60-180 s residence time, preferably 105 s residence time, surface temperature 80-90° C.)
Pressing at the exit (crushing of the foam to give a membrane-like layer)
Subsequently
Condensation at 150° C. (residence time 45-90 s at a temperature of >140° C.)

Formulation:
1. Coating Paint

| 30-40% | Dicrylan PGS (ERBA) | Polyurethane binder |
|---|---|---|
| 0-10% | Water | |
| 15%-20% | Dicrylan Stabilizer 7805 | Foam stabilizer |
| 1-5% | Tubiguard BS | Fluorocarbon |
| 1-10% | White pigment | Titanium dioxide |
| 1-5% | Knittex CHN | Crosslinker |

=>140 g/l foaming, 0.2 mm gap width, amount applied: 20 g/m², unstable foam (see above)

2. Coating Paint

| 30-40% | Dicrylan PGS (ERBA) | Polyurethane binder |
|---|---|---|
| 10% | Water | |
| 15-20% | Dicrylan Stabilizer 7805 | Foam stabilizer |
| 1-5% | Tubiguard BS | Fluorocarbon |
| 0.1-2% | Pigment | |
| 1-5% | Knittex CHN | Crosslinker |
| 5-30% | Expandable graphite | Active flame retardant material |

=>140 g/l foaming, 1 mm gap width, amount applied: 50 g/m², unstable foam (see above)

Example 5: Foam Containing Red Phosphorus

| | | |
|---|---|---|
| 30-40% | Dicrylan PGS (ERBA) | Polyurethane binder |
| 0-10% | Water | |
| 15-20% | Dicrylan Stabilizer 7805 | Foam stabilizer |
| 1-5% | Tubiguard BS | Fluorocarbon |
| 0.1-2% | Pigment | |
| 1-5% | Knittex CHN | Crosslinker |
| 20-30% | Expandable graphite | Active flame retardant material |
| 5-10% | EXOLIT RP 607 | Microencapsulated red phosphorus |

=>140 g/l foaming, 1 mm gap width, amount applied: 50 g/m², unstable foam (see above)

The invention claimed is:

1. A process for producing a flame-retardant, textile sheet product comprising a textile substrate layer, which comprises:
   a) reduction of a washable salt content of plate-like expandable graphite by additional washing, to a proportion of below 0.8% by weight, on a basis of total weight of the plate-like expandable graphite which has been reduced in washable salt, the plate-like expandable graphite having an average plate diameter of at least 0.5 mm, and/or a minimum proportion of 70% by weight having a mesh size of >50 mesh (0.3 mm) being selected,
   b) production of a paste comprising at least one binder, at least one foam stabilizer and expandable graphite which has been reduced in salt as specified in a),
   c) mechanical foaming of a paste produced according to b),
   d) coating of a textile substrate layer with a foam produced according to c),
   e) drying of the foam layer, and
   f) optionally pressing of the foam layer after drying.

2. The process according to claim 1, wherein a woven, knitted or non-woven textile substrate layer is coated in step d).

3. The process according to claim 1, wherein the drying in step e) is carried out at a temperature of 80-100° C. to produce an unstable foam.

4. The process according to claim 1, wherein the drying is carried out at a temperature of 80-100° C. and crosslinking is carried out at 120-170° C. in step e) to produce a stable foam.

5. The process according to claim 1, wherein the coating is carried out in step d) using an amount of foam of from 20 to 400 g/m² and/or at a layer thickness of from 0.2 to 5 mm.

6. The process according to claim 1, wherein in step a) the salt content of plate-like expandable graphite is reduced to below 0.5% by weight.

7. The process according to claim 1, wherein in step a) the salt content of plate-like expandable graphite is reduced to below 0.2% by weight.

8. The process according to claim 1, wherein the plate-like expandable graphite has an average plate diameter in the range of 0.5-3.0 mm.

9. The process according to claim 1, further comprising step f): pressing of the foam layer after drying.

10. The process according to claim 1, wherein the additional washing is by aqueous wet sieving.

11. A flame-retardant, textile sheet product produced by a process according to claim 1, wherein the flame-retardant coating comprises plate-like expandable graphite which has been reduced in salt as specified in a), at least one binder and at least one foam stabilizer.

12. The flame-retardant, textile sheet product according to claim 11, wherein the amount of expandable graphite in the flame-retardant coating is in the range from 5 to 50% by weight.

13. The flame-retardant, textile sheet product according to claim 11, wherein the at least one binder comprises at least one polyurethane binder, and the amount of the at least one polyurethane binder is in the range from 30 to 50% by weight.

14. The flame-retardant, textile sheet product according to claim 11, wherein the amount of the at least one foam stabilizer is in the range from 10 to 20% by weight.

15. The flame-retardant, textile sheet product according to claim 11, wherein the expandable graphite which has been reduced in salt as specified in a) has an expansion of from 40 to 400 ml/g at a temperature of 1000° C.

16. The flame-retardant, textile sheet product according to claim 11, wherein the flame-retardant coating comprises 5-30% by weight of plate-like expandable graphite which has been reduced in salt as specified in a), 30-50% by weight of at least one polyurethane binder and 10-20% by weight of at least one foam stabilizer.

17. The flame-retardant, textile sheet product according to claim 11, wherein the flame-retardant coating further comprises at least one pigment and/or at least one crosslinker and/or at least one fluorocarbon and/or red phosphorus.

18. The flame-retardant, textile sheet product according to claim 11, wherein the product comprises a plurality of coatings, with a first layer being a textile substrate layer on which at least one coating comprising flame-retardant coating is applied.

19. The flame-retardant, textile sheet product according to claim 18, wherein at least one coating is permeable to water vapor and breathing-active.

20. The flame-retardant, textile sheet product according to claim 18, wherein an outer material is partly or entirely colored with luminous dyes.

21. Flame protection clothing comprising the flame-retardant, textile sheet product produced by a process according to claim 1.

* * * * *

UNITED STATES PATENT AND TRADEMARK OFFICE
CERTIFICATE OF CORRECTION

PATENT NO. : 10,851,249 B2
APPLICATION NO. : 16/072530
DATED : December 1, 2020
INVENTOR(S) : Roland Lottenbach et al.

Page 1 of 1

It is certified that error appears in the above-identified patent and that said Letters Patent is hereby corrected as shown below:

On the Title Page

Item (73) Assignee, Line 1, after "Schoeller Textil AG" insert --, (CH)--

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*